(12) United States Patent
Sasakawa et al.

(10) Patent No.: US 6,229,922 B1
(45) Date of Patent: May 8, 2001

(54) METHOD AND APPARATUS FOR COMPARING INCOMING DATA WITH REGISTERED DATA

(75) Inventors: Koichi Sasakawa; Masahito Matsushita, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/273,537

(22) Filed: Mar. 22, 1999

(30) Foreign Application Priority Data

Apr. 8, 1998 (JP) .................................................. 10-096268

(51) Int. Cl.$^7$ ....................................................... G06K 9/62
(52) U.S. Cl. ................................................................. 382/209
(58) Field of Search ..................................... 382/209, 215, 382/217, 218, 219, 220, 224, 225, 226

(56) References Cited

U.S. PATENT DOCUMENTS

| | | | |
|---|---|---|---|
| 4,611,347 | * | 9/1986 | Netruali et al. ........................ 382/159 |
| 4,864,629 | * | 9/1989 | Deering ................................ 382/216 |
| 5,530,483 | * | 6/1996 | Cooper et al. ........................ 348/518 |

FOREIGN PATENT DOCUMENTS 729003    1/1995 (JP) .

* cited by examiner

*Primary Examiner*—Andrew W. Johns
*Assistant Examiner*—Seyed Azarian
(74) *Attorney, Agent, or Firm*—Leydig, Voit & Mayer, Ltd.

(57) ABSTRACT

A data comparison apparatus includes a cross-correlation table storing unit for storing degrees of match calculated for all possible combinations of two registered data, as a cross-correlation table, a comparison processing unit for comparing a currently-read registered data with an incoming data to be compared to calculate the degree of match between them, a comparison determination unit for comparing the calculated degree of match with a threshold value to determine whether there is a match between the currently-read registered data and the incoming data, and for forcedly finishing a further comparison process for remaining registered data if there is a match between the currently-read registered data and the incoming data, and a registered-data reading control unit for determining one registered data that is to be read next out of the registered-data storing unit, using the calculated degree of match and the cross-correlation table.

6 Claims, 5 Drawing Sheets

|       | E (1) | E (2) | E (3) | E (4) | E (5) | E (6) |
|-------|-------|-------|-------|-------|-------|-------|
| E (1) | 100   | 9     | 0     | 13    | 3     | 0     |
| E (2) | 9     | 100   | 0     | 0     | 0     | 0     |
| E (3) | 0     | 0     | 100   | 0     | 0     | 15    |
| E (4) | 13    | 0     | 0     | 100   | 0     | 0     |
| E (5) | 3     | 0     | 0     | 0     | 100   | 0     |
| E (6) | 0     | 0     | 15    | 0     | 0     | 100   |

FIG.4

|      | E (1) | E (2) | E (3) | E (4) | E (5) | E (6) |
|------|-------|-------|-------|-------|-------|-------|
| V (6)| 0     | 0     | 16    | 0     | 0     | 75    |

FIG.5

| | | | FIRST TIME | SECOND TIME | | THIRD TIME | |
|---|---|---|---|---|---|---|---|
| DATA TO BE COMPARED | | | V (6) | | | | |
| REGISTERED DATA | | | E (1) | E (3) | | E (6) | |
| DEGREE OF MATCH | | | 0 | 16 | | 75 | |
| y | | | 1 | 17 | | | |
| yy | Σyy | | 1 | 1 | 289 | 290 | |
| E (1) | x | | 101 | 1 | | | |
| | xy | Σxy | 101 | 101 | 17 | 118 | |
| | xx | Σxx | 10201 | 10201 | 1 | 10202 | |
| | z | | 0.019 | 0.022 | | | |
| E (2) | x | | 10 | 1 | | | |
| | xy | Σxy | 10 | 10 | 17 | 27 | |
| | xx | Σxx | 100 | 100 | 1 | 101 | |
| | z | | 0.198 | 0.138 | | | |
| E (3) | x | | 1 | 101 | | | |
| | xy | Σxy | 1 | 1 | 1717 | 1718 | |
| | xx | Σxx | 1 | 1 | 10201 | 10202 | |
| | z | | 1.000 | 0.327 | | | |
| E (4) | x | | 14 | 1 | | | |
| | xy | Σxy | 14 | 14 | 17 | 31 | |
| | xx | Σxx | 196 | 196 | 1 | 197 | |
| | z | | 0.142 | 0.127 | | | |
| E (5) | x | | 4 | 1 | | | |
| | xy | Σxy | 4 | 4 | 17 | 21 | |
| | xx | Σxx | 16 | 16 | 1 | 17 | |
| | z | | 0.471 | 0.072 | | | |
| E (6) | x | | 1 | 16 | | | |
| | xy | Σxy | 1 | 1 | 272 | 273 | |
| | xx | Σxx | 1 | 1 | 256 | 257 | |
| | z | | 1.000 | 0.998 | | | |

FIG.6 (PRIOR ART)

METHOD AND APPARATUS FOR COMPARING INCOMING DATA WITH REGISTERED DATA

BACKGROUND OF THE INVENTION

1. Field of the Invention

The present invention relates to a data comparison method and a data comparison apparatus for determining whether or not there is a match between an incoming data to be compared and any one of a plurality of registered data stored in a registered-data storing unit. More particularly, it relates to a method and an apparatus for comparing image data or feature data extracted from the image data with a plurality of registered image or feature data.

2. Description of the Prior Art

Figure 6:
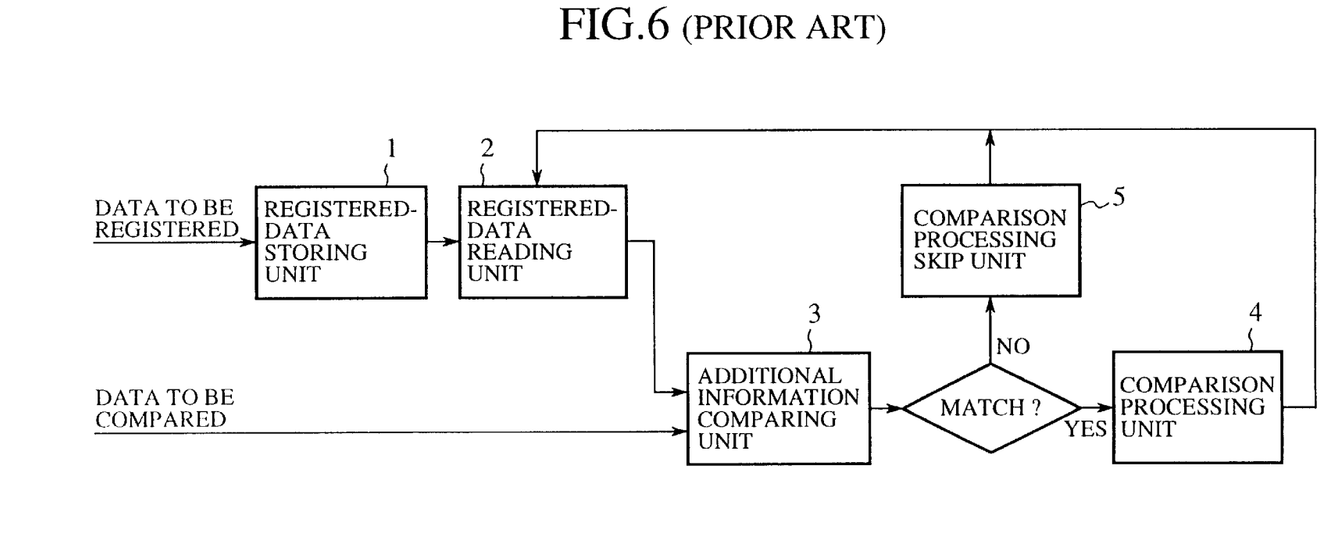
FIG. 6 is a block diagram showing the structure of a prior art data comparison apparatus.

Referring now to FIG. 6, there is illustrated a block diagram showing the structure of a prior art data comparison apparatus. In the figure, reference numeral 1 denotes a registered-data storing unit for storing a plurality of registered data, 2 denotes a registered-data reading unit for reading the plurality of registered data sequentially, 3 denotes an additional information comparing unit for comparing an incoming data's additional information with one registered data's additional information, 4 denotes a comparison processing unit for comparing the incoming data's feature data with the registered data's feature data when the incoming data's additional information matches the registered data's additional information, and 5 denotes a comparison process skipping unit for skipping the comparison process when the incoming data's additional information does not match the registered data's additional information.

In operation, each time the registered-data storing unit 1 receives one data to be registered, it stores the data. When the prior art data comparison apparatus receives an incoming data (or target data) to be compared, the registered-data reading unit 2 sequentially reads the plurality of registered data one by one from the registered-data storing unit 1. The additional information comparing unit 13 then compares the additional information of one registered data read by the registered-data reading unit 2 with the additional information of the incoming data to be compared. When the registered data's additional information matches the incoming data's additional information, the comparison processing unit 4 compares the registered data's feature data with the incoming data's feature data so as to obtain the degree of match between the registered data's feature data and the incoming data's feature data. The comparison processing unit 4 then instructs the registered-data storing unit 2 to read the next registered data. In contrast, when the registered data's additional information does not match the incoming data's additional information, the comparison processing skip unit 5 skips the comparison process that would be carried out for the registered data just read out of the registered-data storing unit 1, and then instructs the registered-data reading unit 2 to read the next registered data. In this manner, the incoming data to be compared is sequentially compared with all of the plurality of registered data stored in the registered-data storing unit 1.

Round-robin comparing an incoming data to be compared with the plurality of registered data and determining that the incoming data matches one registered data showing the highest degree of match are concepts behind the prior art data comparison apparatus mentioned above. Since much time is required to carry out round-robin comparisons, the time required for the comparison process can be reduced by skipping the comparison between the target data to be compared and one registered data whose additional information does not match the target data's additional information, as mentioned above. For example, in the case of comparison of fingerprints, each of an incoming data and a plurality of registered data is constructed of feature data such as features of a corresponding fingerprint, and information about the pattern of the fingerprint is added (fingerprints are classified into some groups according to their patterns), as additional information, to the feature data. The prior art data comparison apparatus compares the target data with each of the plurality of registered data with respect to their additional information first, and then skips the comparison process for their feature data unless there is a match between the target data's additional information and each registered data's additional information.

Japanese Patent Application Publication (KOKAI) No. 7-29003 discloses such a prior art data comparison apparatus, for example. In the reference, there is disclosed a fingerprint comparison (or identification) apparatus in which additional information associated with the feature data of an incoming fingerprint and additional information associated with the feature data of each of a plurality of registered fingerprints are stored and a process of comparing the incoming fingerprint data with one registered fingerprint data whose additional information does not match the incoming fingerprint data's additional information is skipped.

A problem with the prior art data comparison apparatus so constructed as mentioned above is thus that since the prior art data comparison apparatus carries out round-robin comparisons between an incoming data to be compared and all registered data, much time is needed for the comparison processing. Another problem is that if there is an error in the additional information added to any feature data, the process of comparing the feature data with the feature data of the incoming data to be compared is skipped after the comparison between the additional information added to the feature data and the incoming data's additional information even though the feature data is similar to the feature data of the incoming data to be compared. For example, in the case of fingerprint data, information about the pattern of the fingerprint is added, as additional information, to the fingerprint data in most cases. An error can occur in the classification of the pattern of the fingerprint. If there is an error in the classification of the pattern of a registered fingerprint, the process of comparing the feature data of the registered fingerprint with the feature data of an incoming fingerprint whose additional information differs from the registered data's additional information is skipped, after the comparison between the registered data's additional information and the incoming data's additional information, even though the registered fingerprint feature data is similar to the feature data of the incoming fingerprint to be compared, as mentioned above. Accordingly, there is a possibility that a registered data that actually matches the incoming data to be compared is not selected and it is then determined that another registered data matches the incoming data, and therefore a desired registered data, such as a desired fingerprint, cannot be extracted.

SUMMARY OF THE INVENTION

The present invention is made to overcome the above problems. It is therefore an object of the present invention to provide a data comparison method and a data comparison apparatus capable of reducing the time required to compare an incoming data to be compared with a plurality of registered data without the problem caused by an error in the classification of additional information.

In accordance with one aspect of the present invention, there is provided a method of determining whether or not there is a match between an incoming data to be compared and any one of a plurality of registered data stored in a registered-data storing unit, the method comprising the steps of: generating a cross-correlation table including a plurality of degrees of match between two registered data, each of the plurality of degrees of match being calculated for each of all possible combinations of two registered data out of the plurality of registered data stored in the registered-data storing unit; reading one registered data out of the registered-data storing unit; comparing the registered data currently read out of the registered-data storing unit with the incoming data to be compared so as to calculate the degree of match between them; comparing the calculated degree of match with a predetermined threshold value so as to determine whether or not there is a match between the registered data currently read out of the registered-data storing unit and the incoming data, and then forcedly finishing a further comparison process for remaining registered data if it is determined that there is a match between the registered data and the incoming data; and determining one registered data that is to be read next out of the registered-data storing unit in the reading step so as to further compare the next registered data with the incoming data in the first comparing step, using the calculated degree of match and the cross-correlation table.

In accordance with a preferred embodiment of the present invention, the plurality of registered data stored in the registered-data storing unit are numbered, starting at 1, and one registered data that is to be read out of the registered-data storing unit for the first time is the one whose number is set to 1.

In accordance with another preferred embodiment of the present invention, one registered data that is to be read out of the registered-data storing unit for the first time is predetermined according to the cross-correlation table.

In accordance with another preferred embodiment of the present invention, one registered data that is to be read out of the registered-data storing unit for the first time is predetermined according to the incoming data to be compared.

In accordance with another preferred embodiment of the present invention, the method further comprises the steps of counting the number of comparison times that the step of comparing the registered data read out of the registered-data storing unit with the incoming data to be compared has been carried out, and forcedly finishing a further comparison process for remaining registered data when the counted number of comparison times exceeds a predetermined threshold value.

In accordance with another aspect of the present invention, there is provided a data comparison apparatus comprising: a registered-data storing unit for storing a plurality of registered data to be compared with an incoming data: a first comparison processing unit for reading each of all possible combinations of two registered data out of the plurality of registered data stored in the registered-data storing unit so as to calculate a plurality of degrees of match each of which is the one between the two registered data of each of all the combinations; a cross-correlation table storing unit for storing the plurality of degrees of match calculated by the first comparison processing unit as a cross-correlation table; a second comparison processing unit for comparing one registered data currently read out of the registered-data storing unit with the incoming data to be compared so as to calculate the degree of match between them; a comparison determination unit for comparing the calculated degree of match with a predetermined threshold value so as to determine whether or not there is a match between the registered data currently read out of the registered-data storing unit and the incoming data, and for forcedly finishing a further comparison process for remaining registered data if the comparison determination unit itself has determined that there is a match between the registered data and the incoming data; and a registered-data reading control unit for determining one registered data that is to be read next out of the registered-data storing unit so that the second comparison processing unit will compare the next registered data with the incoming data, using the degree of match calculated by the second comparison processing unit and the cross-correlation table stored in the cross-correlation table storing unit.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
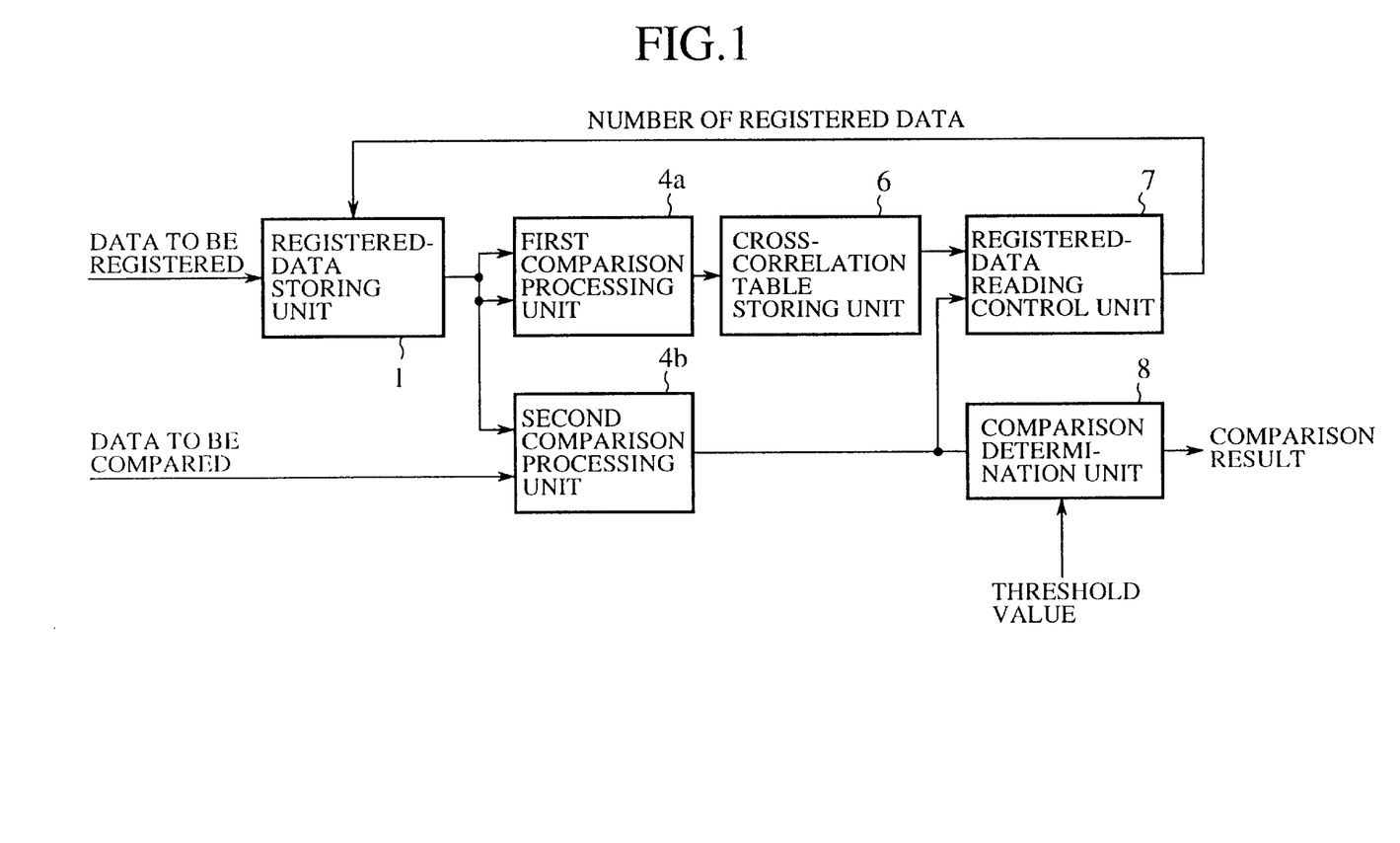
FIG. 1 is a block diagram showing the structure of a data comparison apparatus according to a first embodiment of the present invention.

Referring next to FIG. 1, there is illustrated a block diagram showing the structure of a data comparison apparatus according to a first embodiment of the present invention. In the figure, reference numeral 1 denotes a registered-data storing unit for storing a plurality of registered data that will be compared with incoming data (or target data) 4a denotes a first comparison processing unit for reading all possible combinations of two registered data out of the plurality of registered data from the registered-data storing unit 1, and for comparing the two registered data of each combination so as to calculate a degree of match between them, and 4b denotes a second comparison processing unit for receiving a predetermined one of the plurality of registered data which is currently read out of the registered-data storing unit 1, and for comparing the received registered data with an incoming data so as to calculate a degree of match between them. Each of the first and second comparison processing units 4a and 4b is a section for calculating a degree of match between two data, and operates in the same manner basically.

In addition, reference numeral 6 denotes a cross-correlation table storing unit for storing, as a cross-correlation table, the plurality of degrees of match which have been calculated for all possible combinations of two registered data out of the plurality of registered data stored in the registered-data storing unit 1 by the first comparison processing unit 4a, 7 denotes a reading control unit for determining (or selecting) one registered data that is to be read next out of the registered-data storing unit 1, using the degree of match calculated by the second comparison processing unit 4b and the cross-correlation table stored in the cross-correlation table storing unit 6, and 8 denotes a comparison determination unit for comparing the degree of match calculated by the second comparison processing unit 4b with a predetermined threshold value so as to determine whether or not there is a match between the registered data currently read out of the storing unit 1 and the incoming data to be compared.

In operation, before starting the comparison process, the cross-correlation table is created by following procedures as mentioned below, and is stored in the cross-correlation table storing unit 6. To that end, the first comparison processing unit 4a receives each of all possible combinations of two registered data out of the plurality of registered data, which are read out of the registered-data storing unit 1 under control of the registered-data reading control unit 7, and then calculates a degree of match between the two registered data of each combination. The first comparison processing unit 4a thus calculates the plurality of degrees of match for all possible combinations of two registered data out of the plurality of registered data stored in the registered-data storing unit 1. The plurality of degrees of match calculated are then stored, as a cross-correlation table in the form of a matrix, in the cross-correlation table storing unit 6. In this case, if each of the plurality of registered data is denoted by E(i) (i=1, . . . , n), where n is the number of the plurality of registered data, the degree of match between E(i) and E(j) can be denoted by M(E(i),E(j)). The degree of match between E(i) and E(j) can be in the range of 0 to 100.

Figure 2:
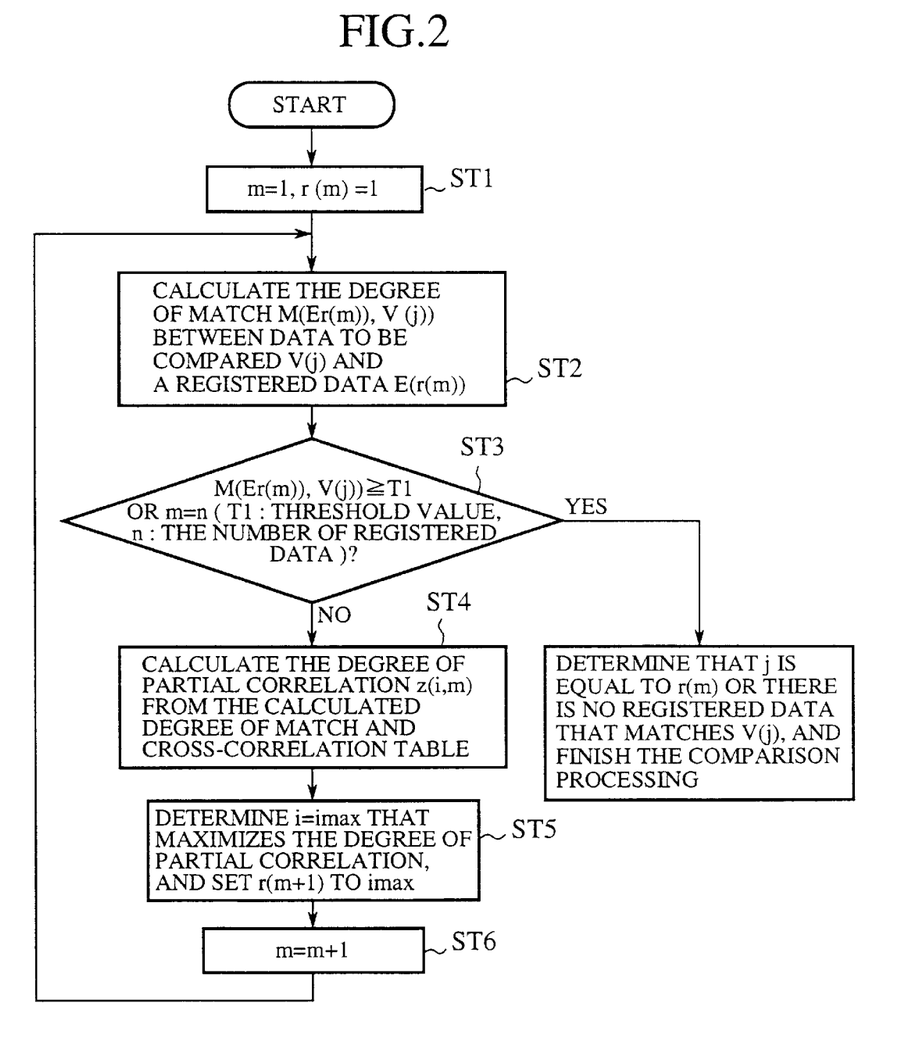
FIG. 2 is a flow diagram showing procedures of comparison processing performed by the data comparison apparatus of the first embodiment of the present invention.

When the data comparison apparatus receives a target data V(j) to be compared, it starts the comparison process by following procedures as mentioned below. Referring next to FIG. 2, there is illustrated a flow diagram showing the procedures of the comparison process. First, m is set to 1 and r(m) is set to 1, as initial settings, in step ST1, where r(m) indicates the number of one registered data that is to be compared with the target data for an m-th time. Therefore, the first registered data E(1) whose number is set to 1 will be compared with the target data for the first time. The second comparison processing unit 4b receives one registered data E(r(m)) whose number is r(m), which is read out of the registered-data storing unit 1 under control of the registered-data reading control unit 7. The second comparison processing unit 4b then, in step ST2, calculates the degree of match M(E(r(m)),V(j)) between the r(m)-th registered data E(r(m)) and the target data V(j) to be compared.

The comparison determination unit 8 then, in step ST3, compares the degree of match M(E(r(m)), V(j)) calculated by the second comparison processing unit 4b with a predetermined threshold value T1. When the degree of match M(E(r(m)),V(j)) is equal to or greater than the predetermined threshold value T1, the comparison determination unit 8 determines that j is equal to r(m), that is, the incoming data V(j) matches the r(m)-th registered data E(r(m)), and finishes the comparison processing. In contrast, when the degree of match M(E(r(m)),V(j)) is less than the predetermined threshold value T1, the comparison determination unit 8 advances to step ST4. In performing step ST3, if m is equal to the total number n of the plurality of registered data stored in the registered-data storing unit 1, the comparison determination unit 8 determines that there is no registered data that matches the target data to be compared, and finishes the comparison processing.

Under control of the registered-data reading control unit 7, the comparison determination unit 8, in step ST4, calculates a degree of partial correlation z(i,m) (i=1, . . . , n) from the degree of match calculated by the second comparison processing unit 4b and the cross-correlation table in the form of a matrix read out of the cross-correlation table storing unit 6, using the following equation (1), for example:

$$z(i, m) = \frac{Sxy}{Sxx + Syy} \qquad (i = 1, \cdots, n) \qquad (1)$$

where Sxy, Sxx, and Syy shown in the equation (1) are given by the following equations (2) to (4):

$$Sxy = \sum_{k=1}^{m} x(r(k), i) \cdot y(r(k), j) \qquad (2)$$

$$Sxx = \sum_{k=1}^{m} x(r(k), i) \cdot x(r(k), j) \qquad (3)$$

$$Syy = \sum_{k=1}^{m} y(r(k), i) \cdot y(r(k), j) \qquad (4)$$

where x(i,j) and y(i,j) respectively denote the sum of the degree of match M(E(i),E(j)) and 1 and the sum of the degree of match M(E(i),V(j)) and 1, which are given by the following equations (5) and (6), and which are introduced so as to prevent the denominator of the degree of partial correlation of the equation (1) from becoming zero because M(E(i),E(j)) and M(E(i),V(j)) can become zero.

$$x(i, j)=M(E(i), E(j))+1 \qquad (5)$$

$$y(i, j)=M(E(i), V(j))+1 \qquad (6)$$

The comparison determination unit 8 further, in step ST5, determines i=imax that maximizes the degree of partial correlation z(i,m) (i=1, . . . , n) calculated in step ST4, and then sets the number (i.e., r(m+1)) of one registered data that is to be compared with the target data for an (m+1)-th time to imax. In performing step ST5, the comparison determination unit 8 calculates and selects imax that does not match any one of the numbers r(1) to r(m) of the registered data that have already been compared with the target data. The comparison determination unit 8 then, in step ST6, increments m by one and returns to step ST2. After that, the aforementioned steps ST2 to ST6 are repeated.

Figure 3:
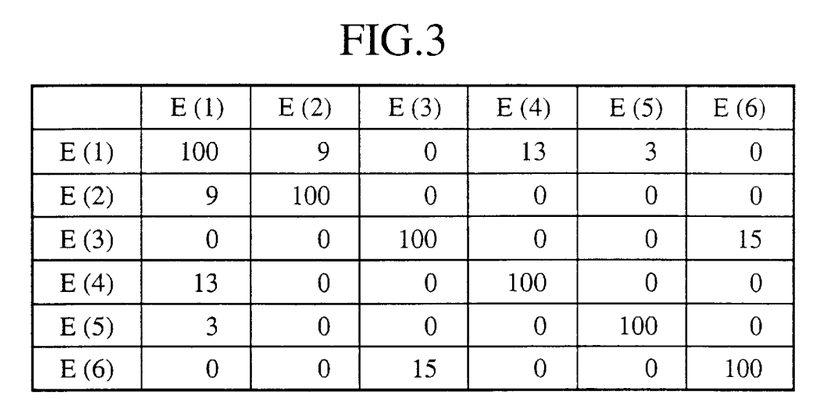
FIG. 3 is a diagram showing an example of the contents of a cross-correlation table for use in the data comparison apparatus of the first embodiment of the present invention.
Figure 4:
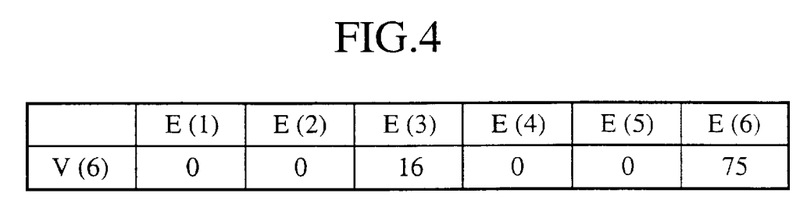
FIG. 4 is a diagram showing an example of a table including a plurality of degrees of match between an incoming data to be compared and each of a plurality of registered data.
Figure 5:
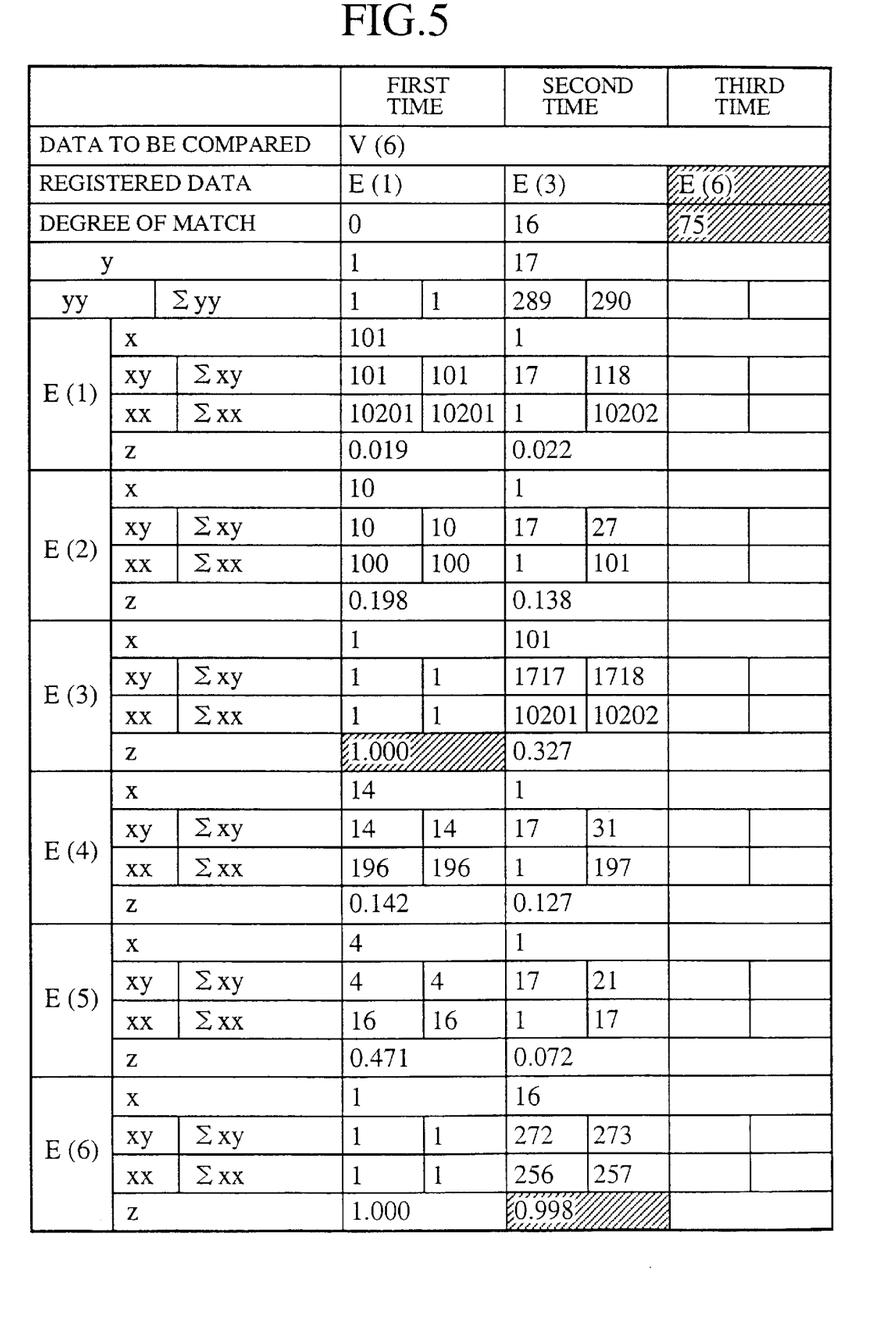
FIG. 5 is a diagram showing an example of concrete procedures of the comparison processing performed by the data comparison apparatus of the first embodiment of the present invention.

Next, a description will be made as to a concrete example of the comparison processing. Assume that the number of the plurality of registered data is 6, and that the cross-correlation table including the plurality of degrees of match, each of which is the one between the two registered data of each of all possible combinations of two registered data out of the plurality of registered data, is as shown in FIG. 3. Further, a plurality of degrees of match, each of which is the one between the target data V(6), which matches the sixth registered data E(6), and each of the plurality of registered data E(1), . . . , E(6) are shown in FIG. 4. Concrete procedures of the comparison processing progress as shown in FIG. 5. In the example shown in FIG. 5, the degree of partial correlation z(i,m) (i=1, . . . , n) is calculated using the equation (1).

As shown in FIG. 5, the target data V(6) to be compared is compared with the first registered data E(1) for the first time. Next, the target data V(6) to be compared is compared with the third registered data E(3). After that, the target data V(6) to be compared is further compared with the sixth registered data E(6). In this manner, after the data comparison apparatus compares the target data V(6) with the sixth registered data E(6) for a third time since the comparison processing was started, it can determine that the target data V(6) matches the sixth registered data E(6). In this example, although six comparisons are needed in conventional round-robin comparison processing, the data comparison apparatus according to the first embodiment can search for the registered data that matches the target data to be compared, only with three comparisons.

In a variant, the following equation (7) or (8) can be used to calculate the degree of partial correlation z(i,m) instead of the equation (1).

$$z(i, m) = \frac{Sxy}{\sqrt{Sxx \cdot Syy}} \quad (i = 1, \cdots, n) \quad (7)$$

$$z(i, m) = -Dxy(i=1, \ldots, n) \quad (8)$$

where Dxy in FIG. 8 is given by the following equation (9):

$$Dxy = \sum_{k=1}^{m} |x(r(k), i) - y(r(k), j)| \quad (9)$$

As previously explained, in accordance with the first embodiment of the present invention, the registered-data reading control unit 7 determines one registered data that is to be read next out of the registered-data storing unit 1 using the degree of match between the currently-read registered data and an incoming data, which has been calculated by the second comparison processing unit 4b, and the cross-correlation table stored in the cross-correlation table storing unit 6, and the comparison determination unit 8 compares the degree of match calculated by the second comparison processing unit 4b with a predetermined threshold value so as to determine whether or not there is a match between the currently-read registered data and the target data to be compared, and finishes the process of comparing the target data with other registered data when the comparison determination unit 8 determines that there is match between the currently-read registered and the target data to be compared. Accordingly, the first embodiment of the present invention offers the advantage of being able to reduce the time required to compare the target data with a plurality of registered data, and to prevent an error in the comparison processing caused by a wrong classification of additional information because no additional information is used.

Second Embodiment

In accordance with the aforementioned first embodiment, the data comparison apparatus compares the target data applied thereto with the first registered data E(1) for the first time. However, one registered data that is to be compared with the target data for the first time does not necessarily need to be the first registered data E(1).

In accordance with a second embodiment of the present invention, there is provided a data comparison apparatus that can determine the number of one registered data that is to be read out of a registered-data storing unit 1 for the first time under control of a registered-data reading control unit 7, according to the contents of a cross-correlation table stored in a cross-correlation storing unit 6. Needless to say, the data comparison apparatus of the second embodiment can have the same structure as of the first embodiment as shown in FIG. 1.

For example, when the contents of the cross-correlation table stored in cross-correlation table storing unit 6 is as shown in FIG. 3, all diagonal elements in the 6×6 matrix are equal to 100 and other elements are equal to 0 or a low value. In the present invention, elements having a value other than 0, which will be referred to as local peaks, except all the diagonal elements in the matrix, play an important role. In other words, one registered data corresponding a row having a number of local peaks and a large variation in the values of those local peaks can be selected as the registered data that is to be read out of the registered-data storing unit 1 for the first time, thereby increasing the probability that the data comparison apparatus can search for the registered data that matches the target data more speedily.

In the example as shown in FIG. 3, while each of the registered data E(2) to E(6) other than the first registered data E(1) has an only local peak, the first registered data E(1) has three local peaks: the one showing the degree of match between itself and E(2) equal to 9, the one showing the degree of match between itself and E(4) equal to 13, and the one showing the degree of match between itself and E(5) equal to 3. Accordingly, one registered data that is to be read out of the registered-data storing unit 1 for the first time under control of the registered-data reading control unit 7 is determined as the first registered data E(1), according to the contents of the cross-correlation table stored in the cross-correlation storing unit 6.

As previously explained, in accordance with the second embodiment of the present invention, the data comparison apparatus determines the number of one registered data that is to be read out of the registered-data storing unit for the first time under control of the registered-data reading control unit 7, according to the contents of the cross-correlation table. Therefore, the second embodiment offers the advantage of being able to increase the probability that the data comparison apparatus can search for the registered data that matches the target data more speedily, thereby further reducing the time required for the comparison processing.

Third Embodiment

As previously mentioned, the data comparison apparatus according to the above-mentioned second embodiment determines the number of one registered data that is to be read out of the registered-data storing unit for the first time under control of the registered-data reading control unit 7, according to the contents of the cross-correlation table. In accordance with a third embodiment of the present invention, there is provided a data comparison apparatus that can determine the number of one registered data that is to be read out of a registered-data storing unit for the first time according to an incoming data to be compared, instead of the cross-correlation table. Needless to say, the data comparison apparatus of the third embodiment can have the same structure as of the first embodiment as shown in FIG. 1.

For example, a plurality of registered data and the target data to be compared are classified into some groups according to a classification criterion in advance of the comparison processing. In the comparison processing, the number of one registered data that is to be read out of the registered-data storing unit for the first time can be selected from among some registered data that belong to the same group as the target data to be compared. The selected registered data that is to be read for the first time must be similar to the target data. This results in increasing the probability that the data comparison apparatus can search for the registered data that matches the target data to be compared more speedily.

As previously explained, in accordance with the third embodiment of the present invention, the data comparison apparatus determines the number of one registered data that is to be read out of the registered-data storing unit for the first time under control of the registered-data reading control unit 7, according to the target data to be compared. Therefore, the third embodiment offers the advantage of being able to increase the probability that the data comparison apparatus can search for the registered data that matches the target data to be compared more speedily, thereby further reducing the time required for the comparison processing.

Fourth Embodiment

In the above-mentioned first embodiment, if the target data to be compared matches any one of the plurality of registered data stored in the registered-data storing unit 1, the data comparison apparatus can search for the registered data that matches the target data after it performs comparisons a sufficiently small number of times compared with the total number n of the plurality of registered data. However, if there is no registered data that matches the incoming data to be compared, the data comparison apparatus according to the first embodiment repeats the comparison processing until m is equal to n. Consequently, the data comparison apparatus carries out the round-robin comparisons between the target data and all the registered data. To solve the problem that arises when there is no registered data that matches the target data to be compared, in accordance with a fourth embodiment of the present invention, there is provided a data comparison apparatus capable of aborting the comparison processing after it has carried out comparisons a sufficiently small number of times compared with the total number of the plurality of registered data. Needless to say, the data comparison apparatus of the third embodiment can have the same structure as of the first embodiment as shown in FIG. 1.

A comparison determination unit 8 counts the number of times m that it carries out comparisons for the target data to be compared, and then compares the number of comparisons m with a predetermined threshold value T2. When the number of comparisons m exceeds the predetermined threshold value T2, the comparison determination unit 8 aborts or forcedly finishes the comparison processing for the remaining registered data. For example, when T2 is preset to n/3, there arises no problem if there is a registered data that matches the target data to be compared, because in most cases the comparison determination unit 8 can search for the registered data that matches the target data after it has performed comparisons a small number of times equal to or less than T2. In contrast, even when there is no registered data that matches the target data to be compared, the comparison determination unit 8 of the fourth embodiment forcedly stops the comparison processing when the number of comparisons m exceeds the predetermined threshold value T2, that is, when the data comparison apparatus has finished performing comparisons on one-third or more of the total number of the plurality of registered data. Accordingly, the time required for the comparison processing can be reduced to about one-third what it used to be.

As previously explained, in accordance with the fourth embodiment of the present invention, the comparison determination unit 8 counts the number of times that the second comparison processing unit 4b carries out comparisons for the target data to be compared. When the number of comparisons exceeds a predetermined threshold value, the data comparison apparatus aborts the comparison processing for the remaining registered data. There arises no problem if there is a registered data that matches the target data to be compared, because the data comparison apparatus can search for the registered data that matches the target data after it has performed comparisons a small number of times equal to or less than the predetermined number of times. Accordingly, the fourth embodiment of the present invention offers the advantage of being able to reduce the time required for the comparison processing even if there is no registered data that matches the target data to be compared.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of determining whether there is a match between an incoming data to be compared and any one of a plurality of registered data stored in registered-data storing means, said method comprising:

generating a cross-correlation table including a plurality of degrees of match between two registered data in advance, the plurality of degrees of match being calculated for each of all possible combinations of two registered data of the plurality of registered data stored in said registered-data storing means;

reading one registered data out of said registered-data storing means;

comparing said registered data currently read out of said registered-data storing means with said incoming data to be compared so as to calculate the degree of match between them;

comparing said calculated degree of match with a threshold value so as to determine whether there is a match between said registered data currently read out of said registered-data storing means and said incoming data, and then forcedly finishing a further comparison process for remaining registered data if there is a match between said registered data and said incoming data; and determining one registered data that is to be next out of said registered-data storing means in said reading step so as to further compare the next registered data with said incoming data in said first comparing step, using said calculated degree of match and said cross-correlation table.

2. The method according to claim 1, wherein said plurality of registered data stored in said registered-data storing means are numbered, starting at 1, and the registered data that is to be read out of said registered-data storing means for the first time is the number 1.

3. The method according to claim 1, wherein one registered data that is to be read out of said registered-data storing means for the first time is determined according to said cross-correlation table.

4. The method according to claim 1, wherein one registered data that is to be read out of said registered-data storing means for the first time is determined according to said incoming data to be compared.

5. The method according to claim 1, further comprising of counting the number of comparison times that said step of comparing the registered data read out of said registered-data storing means with said incoming data to be compared has been carried out, and forcedly finishing a further comparison process for remaining registered data when the counted number of comparisons exceeds a threshold value.

6. A data comparison apparatus comprising:

registered-data storing means for storing a plurality of registered data to be compared with an incoming data:

first comparison processing means for reading each of all possible combinations of two registered data out of the plurality of registered data stored in said registered-data storing means so as to calculate a plurality of degrees of match each of which is between the two registered data of each of all the combinations;

cross-correlation table storing means for storing said plurality of degrees of match calculated by said first comparison processing means as a cross-correlation table in advance;

second comparison processing means for comparing one registered data currently read out of said registered-data storing means with said incoming data to be compared so as to calculate the degree of match between them;

comparison determination means for comparing said calculated degree of match with a threshold value so as to determine whether there is a match between said registered data currently read out of said registered-data storing means and said incoming data, and for forcedly finishing a further comparison process for remaining registered data if said comparison determination means has determined that there is a match between said registered data and said incoming data; and registered-data reading control means for determining one registered data that is to be next out of said registered-data storing means so that said second comparison processing means will compare the next registered data with said incoming data, using said degree of match calculated by said second comparison processing means and said cross-correlation table stored in said cross-correlation table storing means.

* * * * *

UNITED STATES PATENT AND TRADEMARK OFFICE
CERTIFICATE OF CORRECTION

PATENT NO. : 6,229,922 B1
DATED : May 8, 2001
INVENTOR(S) : Sasakawa et al.

Page 1 of 1

It is certified that error appears in the above-identified patent and that said Letters Patent is hereby corrected as shown below:

Drawing,
Replace Figure 2 with:

Signed and Sealed this

Second Day of April, 2002

Attest:

Attesting Officer

JAMES E. ROGAN
Director of the United States Patent and Trademark Office